May 17, 1932.  A. E. SMITH ET AL  1,858,688
PULVERIZED FUEL FURNACE
Filed July 18, 1925  2 Sheets-Sheet 2
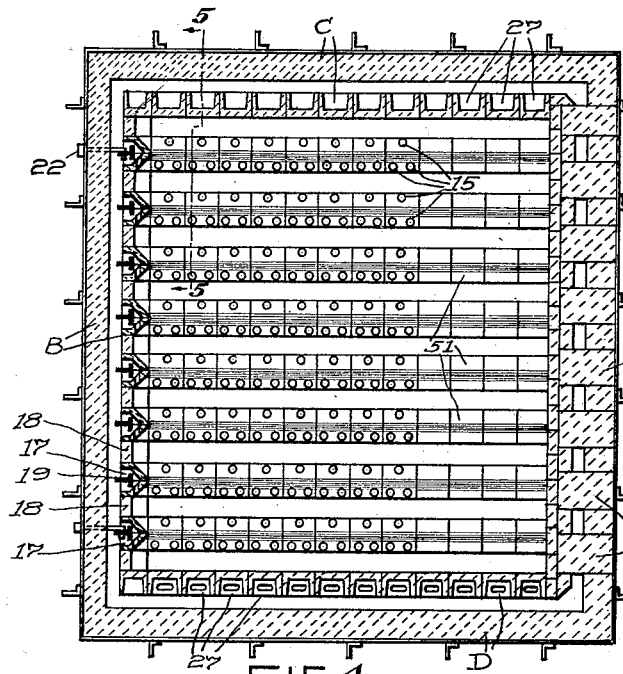

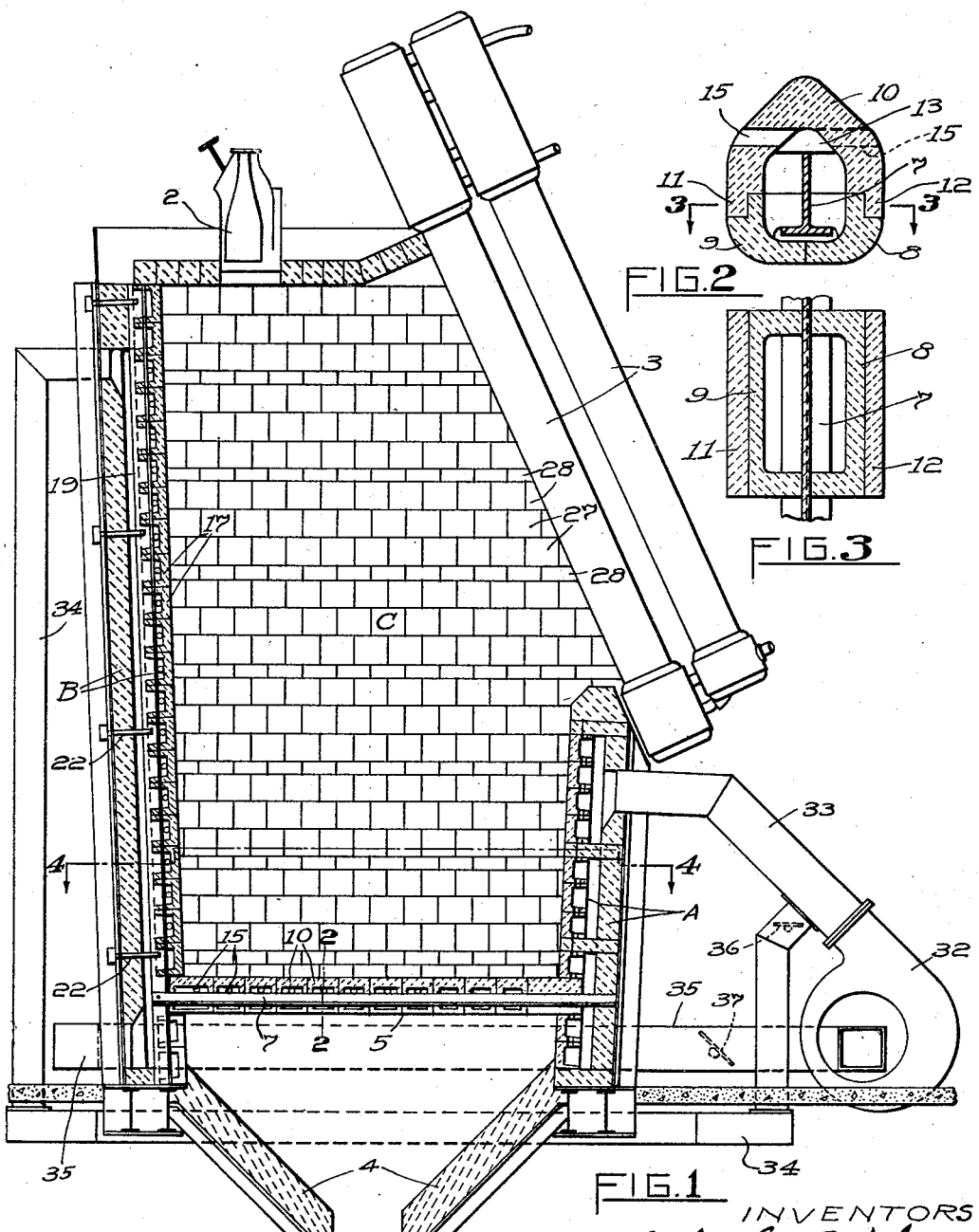

Patented May 17, 1932

1,858,688

UNITED STATES PATENT OFFICE

ARTHUR E. SMITH, OF CAMBRIDGE, AND OSCAR NYGAARD, OF SAUGUS, MASSACHUSETTS, ASSIGNORS TO BERNITZ FURNACE APPLIANCE COMPANY, OF BOSTON, MASSACHUSETTS, A CORPORATION OF MASSACHUSETTS

PULVERIZED FUEL FURNACE

Application filed July 18, 1925. Serial No. 44,470.

This invention relates to furnaces and more especially to furnaces designed to burn pulverized fuel.

As is well understood by those skilled in this art, pulverized fuel is usually introduced into such furnaces in a stream of air, and it burns while suspended or floating in the air. This results in producing an exceedingly high temperature in and adjacent to the zone of combustion. The ash resulting from such combustion drops from the flame into the lower part of the furnace, but the temperature is so high that the particles of ash and clinker tend to fuse or coalesce and form a solid mass which can be removed from the furnace only with great difficulty. A further complication resulting from the high temperature in the furnace is that the lining or inner wall section of the combustion chamber softens or becomes plastic under prolonged operation. This gradually results in the disintegration of the wall and ultimately necessitates its renewal These conditions are well understood and widely recognized, and it has been proposed heretofore to provide cooling screens in the furnace either to protect the furnace walls or to reduce the temperature of the ash as it gravitates toward the bottom of the furnace. The present invention is especially concerned with the constructions provided for cooling the furnace walls and the ash, and it aims to improve such constructions with a view to facilitating the repairing operation and reducing the expense of manufacture and maintenance in furnace structures of this general type.

The nature of the invention will be readily understood from the following description when read in connection with the accompanying drawings, and the novel features of the invention will be particularly pointed out in the appended claims.

Referring now to the drawings,

Figure 1 is a vertical, sectional view through a portion of a pulverized fuel furnace embodying features of the present invention;

Fig. 2 is a vertical sectional view through one of the sections of the cooling screen located in the lower part of the furnace shown in Fig. 1;

Fig. 3 is a horizontal sectional view on the line 3—3, Fig. 2;

Fig. 4 is a horizontal sectional view taken substantially on the line 4—4, Fig. 1;

Fig. 5 is a sectional view of a portion of the furnace substantially on the line 5—5, Fig. 4;

Figs. 6 and 7 are horizontal sectional views showing different side wall constructions;

Fig. 8 is a transverse, sectional view of a brick embodying one feature of this invention;

Fig. 9 is a side elevation of one section of the brick shown in Fig. 8; and

Fig. 10 is a sectional view on the line 10—10, Fig. 5.

The furnace construction shown includes four walls indicated at A, B, C, and D, respectively, these walls being arranged to form a combustion chamber. The pulverized fuel to be burned is delivered to the chamber through a nozzle or burner 2, Fig. 1, which directs the fuel downwardly so that the general path of the fuel through the furnace is somewhat U-shaped, as is usual in furnaces of this type, the gases passing out of the combustion chamber at the upper right-hand side, Fig. 1, and heating the water tubes 3. The ash formed during combustion drops out of the flame and falls through the lower part of the furnace against the inclined walls 4—4 and drops into a suitable ash receiving compartment.

An important feature of the present invention resides in a cooling screen through which the ash falls. This screen is located horizontally across the lower part of the furnace and consists of a series of parallel sections 5. Each section comprises a series of hollow bricks supported end to end with the spaces in them communicating with each other so that they form an air passage. The bricks may be made of carborundum, fire clay, or other suitable refractory material, and they are supported in their operative positions by a flanged bar which preferably is completely encircled by the bricks. The preferred construction is shown in section in Figs. 2 and 3. It will be observed that the bricks are supported by a T-bar 7, and that each brick comprises two lower sections 8 and 9, respectively, which are slotted to receive the flange or head of the bar and are shaped to abut against the web of the bar. The brick also includes a third section 10 which is provided at its opposite sides with marginal flanges 11 and 12, respectively, to fit into grooves formed in the parts 8 and 9 and lock these two parts on the bar 7. A rib 13 projects downwardly from the section 10 at each end thereof and rests on the upper edge of the web of the bar. The brick thus is interlocked with the bar 7. At the same time the brick completely encircles the bar and protects it from attack by the heat and gases of the furnace. The ends of the brick are open between the lower edge of the rib 13 and the upper edges of the sections 8 and 9 so that an air space is provided through the brick from one end to the other with the web of the bar 7 dividing this air space longitudinally. Since the bricks are supported end to end, the air spaces in adjacent bricks are in communication with each other and an air passage thus is provided through each screen section from one end to the other. A forced circulation of air is maintained through these sections and thus keeps the bricks relatively cool.

Preferably, also, the bricks are provided with apertures for discharging a limited quantity of air into the furnace. Referring to Figs. 2 and 4 it will be seen that the upper part of the brick section 10 is of V-shaped cross-section, and that laterally directed apertures or air holes 15 are formed through the wall of the section. Air discharged through these apertures will be directed horizontally against adjacent sections and form an approximately horizontal layer of relatively cool air thus creating a zone of cool air through which the ash falls.

As the ash and clinker gravitates from the flame through the screen 5, it is cooled below the point at which the particles can fuse and coalesce so that the ash falls into the ash pit or receptacle in a granular condition and any agglomeration or coalescence of the ash or clinker is effectually prevented.

The size and distribution of the apertures 15 can be made to suit the requirements of the individual installation and the air pressure maintained in the passages of the cooling screen can be regulated as desired. Usually it is not desirable to discharge air from the screen along the part thereof adjacent to the wall A, and consequently, the bricks in this part of the screen have been shown imperforate.

It should be noted that a screen of the character above described can be manufactured and installed very economically and in case any brick or brick sections become broken they can be replaced without disturbing adjacent bricks. The flow of air through the bricks keeps them at a temperature below the point at which they become plastic, and the bricks protect the bar which support them so that deterioration of the screen is very slow.

A construction resembling that of the screen in some respects is also used in the walls of the furnace. Referring to Figs. 1 and 4 it will be seen that the wall B comprises an inner or lining section and an outer section with an air space between them. The lining section or facing comprises vertical courses 17 of hollow brick alternating with vertical courses 18 or plain brick. The hollow bricks are supported on T-bars 19 and each brick preferably consists of two sections 20 and 21, Figs. 8 and 9, these sections being slotted to fit around the head and against the web of the T-bar 19. The plain bricks 18 hold the hollow bricks in their interlocked relationship with the head or flange of the bar. That is, they prevent the sections 20 and 21 from moving laterally away from the bar. The bar thus supports the bricks in their operative positions in much the same way that the bar 7 supports the bricks of the screen sections 5. In order to steady the T-bar 19, its web is drilled at several points to receive the ends of L-shaped bolts 22, Figs. 1 and 4, which extend through the rear section of the wall B. Preferably a part, at least, of the bricks in the vertical courses 19 are provided with apertures or air holes 24 which are directed laterally so that the air discharged through them will flow across the faces of the adjacent bricks. Air under pressure is forced through the space between the back and facing of the wall, a part of this air escaping through the apertures 24, so that the facing is kept cool partly by the circulation of air in contact with the rear surfaces of the bricks, and partly by the air discharged through the facing and flowing across the front surfaces of the bricks.

Other wall constructions are shown in Figs. 6 and 7. In Fig. 6 the courses of hollow brick alternate with vertical courses 18 of plain brick, the latter courses also including tie bricks 44. Additional tie bricks 25 may also be used in connection with the hollow bricks to secure the inner or lining section to the outer section of the wall.

Fig. 7 shows a similar arrangement in which the vertical courses 17' of hollow brick alternate with plain and tie brick courses 26.

The wall constructions above described may also be used for the side and rear walls, or constructions of the type shown more particularly in Figs. 4 and 5 may be used. The three walls A, C and D as shown, are essentially alike in construction and consist of rear and facing sections with air spaces between them. The facing sections are made up of several horizontal courses 27 of hollow bricks alternating with narrow horizontal courses 28 which include tie bricks that bond the facing to the rear wall.

In the lower part of the wall B adjacent to the screen 5 where it is desirable to change the contour of the wall from corrugated to a plain form, a special brick, such as that shown at 30, Fig. 10, is used at the bottom of the vertical courses 17. The upper part of this brick has a corrugated face to fit the V-shaped cross section of the special hollow bricks of which the vertical courses 17 are made. The lower part of the brick, however, is of rectangular outline and agrees in form and dimensions with the plain bricks which make up the lower part of the wall.

Various arrangements may be used for circulating air through the cooling screen and the walls of the furnace. As shown, the air from the blower 32 is divided, part of it being discharged through the conduit 33 into the air space in the wall A, and part of it going through the conduit 34 to the top of the wall B. A return conduit 35 leads the air from the lower end of the latter wall to the intake of the blower 32. Dampers 36 and 37 in the conduits 34 and 35, respectively, permit adjustment of the air distribution. Air flows down through the wall B and through the screen sections 5 to the return conduit 35, a part of this air being discharged into the furnace through the apertures in the screen. It should be noted that this air is preheated and that the degree of preheat can be controlled by the adjustment of the dampers so as to vary the proportion of air which is returned from the furnace to the blower. No claim is made in this application to this circulating system.

It will now be evident that this invention provides a furnace construction in which the walls are effectually protected from overheating and, consequently, from the disintegration which attends excessive heating. Furthermore, the cooling screen above described prevents the fusing of the ash and clinker together, and is of particular advantage because of the ease with which it can be manufactured, installed, and repaired. The current of air flowing through the screen sections 5 is of advantage both in keeping the temperature of the refractory elements below the point at which ash and clinker would stick to them, and also in maintaining an approximately horizontal zone of relatively cool air which reduces the temperature of the ash and clinker as they fall through this zone.

While we have herein shown and described the best forms of our invention that we have so far devised, it is contemplated that the invention may be embodied in other forms without departing from the spirit or scope thereof. For example, the arrangement and width of the screen sections and of the spaces between them may be varied. In fact, the arrangement actually used in an individual installation will depend to a large extent on the nature of the design and the conditions encountered. It will also be evident that the invention is not limited to the conjoint use of the features shown.

Having thus described our invention, what we desire to claim as new is:

1. In a pulverized fuel furnace, a screen comprising a series of screen sections, means for supporting said sections in positions extending across the lower part of said furnace, each section including a series of hollow bricks located end to end with the spaces in them communicating with each other and forming air passages, and means for supporting said bricks in said relationship.

2. In a pulverized fuel furnace, a screen comprising a series of screen sections, means for supporting said sections in positions extending across the lower part of said furnace, each section including a series of hollow bricks located end to end with the spaces in them communicating with each other and forming air passages, means for supporting said bricks in said relationship, said sections having apertures for discharging air from said passages into the furnace, and means for forcing air through said passages and apertures.

3. In a pulverized fuel furnace, the combination of walls providing a combustion chamber, a non-metallic refractory cooling screen located in the lower part of said chamber below the combustion zone and comprising a plurality of parallel sections spaced apart, means for supporting said sections in the lower part of said chamber, each of said sections having an air passage extending longitudinally thereof and having laterally directed apertures for discharging air into said chamber, and means for forcing air through said passages and apertures.

4. In a furnace, the combination of a series of hollow refractory bricks, a flanged bar supporting said bricks in an end to end relationship with the spaces in said bricks communicating directly with each other, said bricks being interlocked with said bar and encircling the bar, said bricks having apertures extending from the spaces therein laterally through the walls thereof, and means for forcing air through said spaces and said apertures.

5. In a furnace, the combination of a series of hollow refractory bricks, and a flanged bar supporting said bricks in an end to end relationship to each other; each of said bricks comprising two sections slotted to fit on the flange and against the web of said bar, and a third section for locking the first two sections on the bar and cooperating with them to encircle the bar.

6. In a pulverized fuel furnace, the combination of a hollow wall at one side of the combustion chamber, a screen comprising a plurality of sections each including a series of hollow bricks located end to end and a bar for supporting said bricks in said end to end relationship with the spaces in them communicating with each other, means for supporting said screen across the lower part of said furnace below the combustion zone therein, means for forcing air through said hollow wall and through the spaces in said bricks in the screen, and means for regulating the distribution of air between said wall and said screen.

In testimony whereof we have hereunto signed our names to this specification.

ARTHUR E. SMITH.
OSCAR NYGAARD.